United States Patent
Beyer et al.

(10) Patent No.: US 8,371,633 B2
(45) Date of Patent: Feb. 12, 2013

(54) CENTER CONSOLE

(75) Inventors: Kurt Beyer, Wiesbaden (DE); Jong Hyuk Park, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/038,115

(22) Filed: Mar. 1, 2011

(65) Prior Publication Data

US 2011/0215607 A1 Sep. 8, 2011

(30) Foreign Application Priority Data

Mar. 2, 2010 (DE) .......... 10 2010 009 897

(51) Int. Cl.
*B60R 7/04* (2006.01)

(52) U.S. Cl. .......... 296/24.34; 296/37.8; 224/280; 224/555

(58) Field of Classification Search ............... 296/24.34, 296/37.1, 37.8; 224/280, 545, 555, 564, 224/566; 248/22.139
See application file for complete search history.

(56) References Cited

U.S. PATENT DOCUMENTS

| | | |
|---|---|---|
| 5,246,190 A | 9/1993 | Swirkal |
| 5,997,081 A | 12/1999 | Kayumi |
| 6,068,221 A | 5/2000 | Rosen |
| 6,497,443 B2 | 12/2002 | Worrell et al. |
| 6,971,697 B2 | 12/2005 | Morales |
| 7,029,048 B1 | 4/2006 | Hicks et al. |
| 7,513,553 B2 | 4/2009 | Singh et al. |
| 2007/0119885 A1 | 5/2007 | Miller et al. |
| 2007/0272694 A1 | 11/2007 | May et al. |
| 2007/0296234 A1 | 12/2007 | Sturt et al. |
| 2008/0007079 A1* | 1/2008 | Sturt et al. .......... 296/24.34 |
| 2008/0128422 A1 | 6/2008 | Adler et al. |

FOREIGN PATENT DOCUMENTS

| | | |
|---|---|---|
| DE | 9217957 U1 | 5/1993 |
| DE | 4342182 A1 | 6/1995 |
| DE | 29903164 U1 | 5/1999 |
| DE | 19808381 A1 | 9/1999 |
| DE | 10163047 C1 | 5/2003 |
| DE | 102004034711 A1 | 2/2006 |
| DE | 202006019121 U1 | 2/2007 |
| DE | 102006048565 A1 | 4/2008 |
| EP | 0886604 A1 | 12/1998 |
| FR | 2927582 A1 | 8/2009 |

OTHER PUBLICATIONS

German Patent Office, German Search Report for German Application No. 102010009897, Jul. 14, 2010.

* cited by examiner

*Primary Examiner* — Glenn Dayoan
*Assistant Examiner* — Jason S Daniels
(74) *Attorney, Agent, or Firm* — Ingrassia Fisher & Lorenz, P.C.

(57) ABSTRACT

A center console is provided between two vehicle seats arranged next to each other. At least one front side of the center console, at least one container can be arranged in a detachable manner.

8 Claims, 4 Drawing Sheets

CENTER CONSOLE

CROSS-REFERENCE TO RELATED APPLICATION

This application claims priority to German Patent Application No. 102010009897.3, filed Mar. 2, 2011, which is incorporated herein by reference in its entirety.

TECHNICAL FIELD

The technical field relates to a center console which is provided between two vehicle seats arranged next to each other.

BACKGROUND

U.S. Pat. No. 7,029,048 B1 describes containers arranged in a center console of a vehicle. The containers can be inserted in receiving spaces provided for this purpose. However, the containers can only be used by persons who are seated directly next to the center console. If the center console is arranged between the two front seats, which is the most common case, persons seated in the rear seats can not access these containers at all or at best only with considerable difficulties. In the past years, electronics have increasingly found their way into the motor vehicle so that in the area of the center console, more and more user instruments such as, for example, rotary knobs, switches and the like had to be accommodated. In the course of this development, there is hardly any space or even no space at all available for containers to be arranged in this area.

It is thus at least one object to provide new mounting possibilities for containers in the area of the center console. In addition, other objects, desirable features and characteristics will become apparent from the subsequent summary and detailed description, and the appended claims, taken in conjunction with the accompanying drawings and this background.

SUMMARY

A center console is provided between vehicle seats arranged next to each other. At least one front side of the center console at least one container can be arranged in a detachable manner. In this manner, a specific area of the center console is provided for the arrangement of the container which is readily accessible for persons seated in the front seats as well as for persons seated in the rear seats. This is in particular the case if on each front side, one container is arranged.

Preferably, the at least one container can be at least one bag and/or at least one box. The bag can be, for example, a garbage bag, but also a shopping bag or other bags of everyday use. The box can serve for storing objects and can be provided in its interior with partitions so as to be able to separate the objects to be stored properly from each other. However, it is also possible that the box is a garbage container.

The at least one bag can have carrying handles and two hooks can be arranged on at least one of the front sides of the center console. Accordingly, the bag can be hung up with its carrying handles on the hooks in a simple and convenient manner. In this manner, for example, a shopping bag can be quickly and securely stored in the car. This is in particular convenient if objects are stored in the shopping bag which should not fall out of the shopping bag during travel.

The at least one box can be detachably arranged by means of a latching connection on one of the front sides of the center console. If, for example, toys for children are stored in the box, the box can be taken at the end of the travel to a children's room and can be put away there. Prior to the next travel, the box filled with toys can then be attached again at the center console.

The at least one box can have hooks at its side walls to hang up the bag, in particular the plastic bag. In the box, a plurality of the plastic bags wound up on a roll can be deposited. The plastic bags can be garbage bags, one of which can be hung up on the hooks. Once the plastic bag is full, it can be disposed of and replaced by a new plastic bag from the roll. Of course, instead of plastic bags, shopping bags or other objects can be attached.

A frame to which the bag can be attached can be detachably arranged by means of the latching connection on one of the front sides of the center console. If the center console is arranged between the front seats, the frame can be arranged on the front or the rear front side. If two frames are available, one frame can be arranged on each front side. On the frame, a cover and a clamping element, which is also formed like a frame, can be arranged so as to be pivotable relative to the frame. In this manner, the bag can be clamped between the frame and the clamping element. In this case, the bag does not necessarily have to have the carrying handles to attach the bag to the center console. Preferably, in the region of an opening edge, the bag can be clamped between the frame and the clamping element. The at least one box can extend at least approximately up to a floor. Thus, the box has a maximum filling volume.

The invention further relates to a motor vehicle which has a center console.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
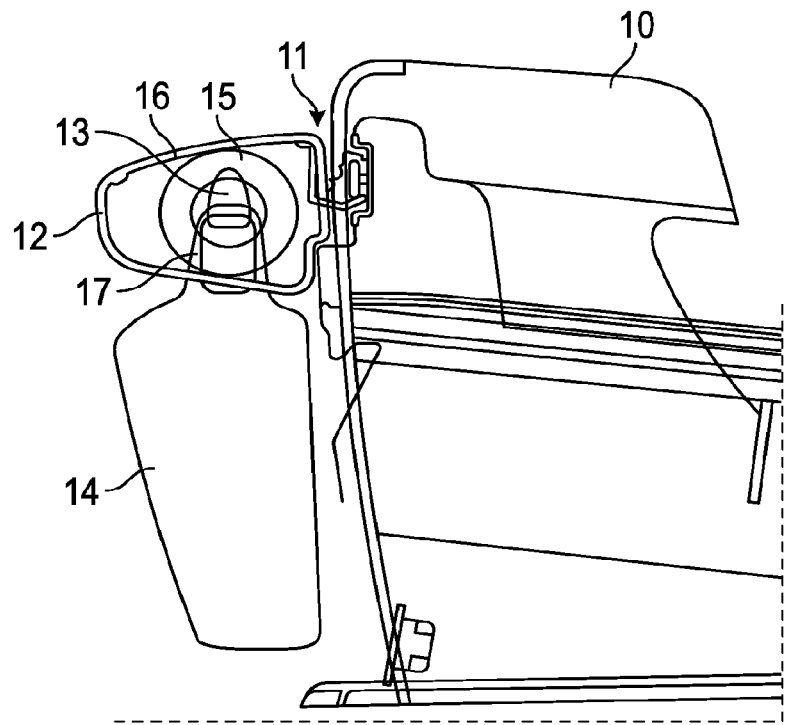
FIG. 1 shows a side view of a center console, a box and a carrying bag.

FIG. 1 shows a center console 10 placed between two seats which are not illustrated here in more detail. A box 12 can be detachably fastened to the center console 10 by means of a latching connection 11. On the side walls of the box 12, hooks 13 are attached to hang a bag 14 thereon with its carrying handles 17, wherein the bag can preferably be a plastic bag. Inside the box 12, the plastic bags wound up on a roll 15 are deposited. For removing and depositing the plastic bags, the box 12 has a cover 16 that can be opened and closed.

Figure 2:
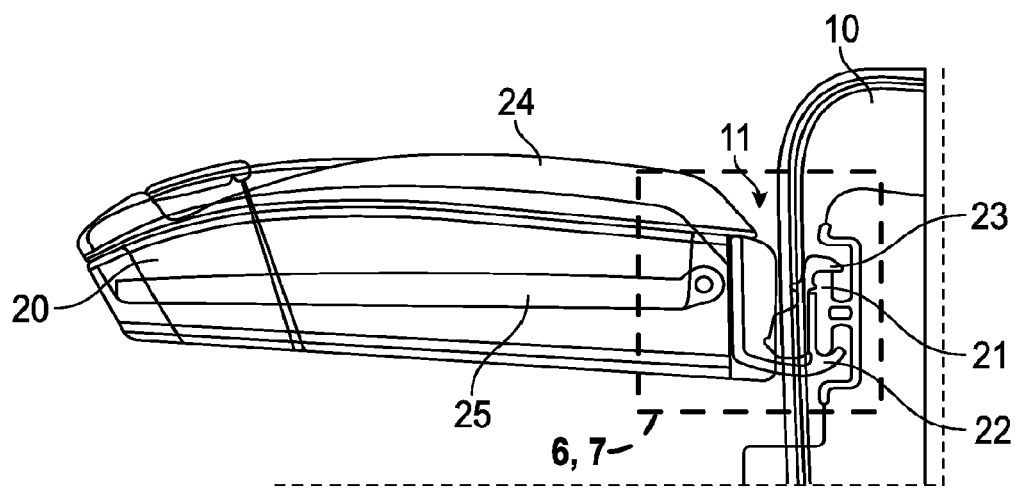
FIG. 2 shows a center console of a frame arranged on the center console.

FIG. 2 shows a frame 20 which can also be detachably fastened to the center console 10 by means of the latching connection 11. On the center console 10, a T-shaped hook 21 is provided which can be encompassed from below by a claw 22 attached to the frame 20. A claw 23 pivotably attached to the frame 20 encompasses the hook 21 from above. Thus, the claws 22 and 23 are pivotable relative to each other like the handles of a pair of pliers. Prior to fastening, the claw 23 is pivoted to the left. Then, the claws 22 and 23 jointly form an open position. During the fastening process, the claw 23 pushes against the hook 21 so that the claw 23 is pivoted to the right and encompasses the hook 21, whereby the frame 20 is fastened to the center console 10. Once the frame 20 is fastened to the center console, the claws 22 and 23 both encompass the hook 21. Then, the claws 22 and 23 jointly form a closed position. For removing the frame 20, the same is pivoted upwards wherein the claw 23 is pivoted to the left relative to the claw 22 and the latching connection 11 opens again.

Figure 3:
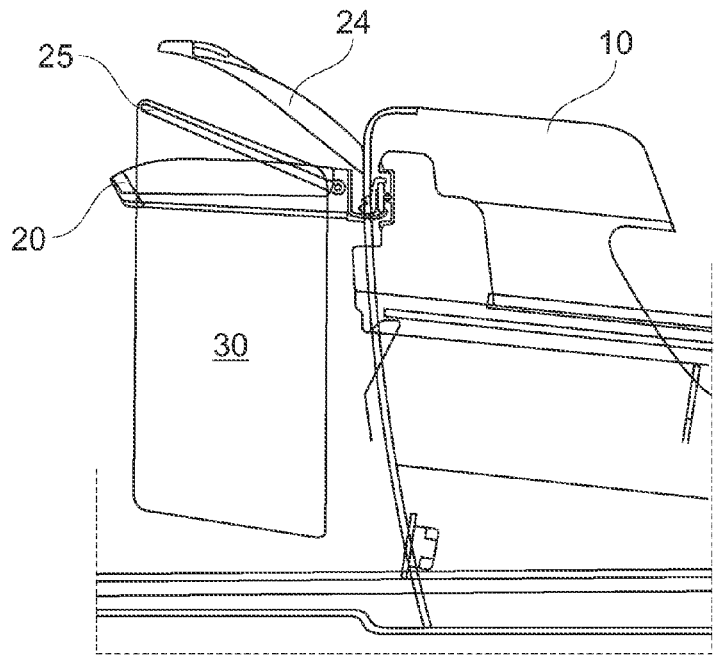
FIG. 3 to FIG. 4 show a side view of the frame from FIG. 2 in different operating positions.
Figure 4:
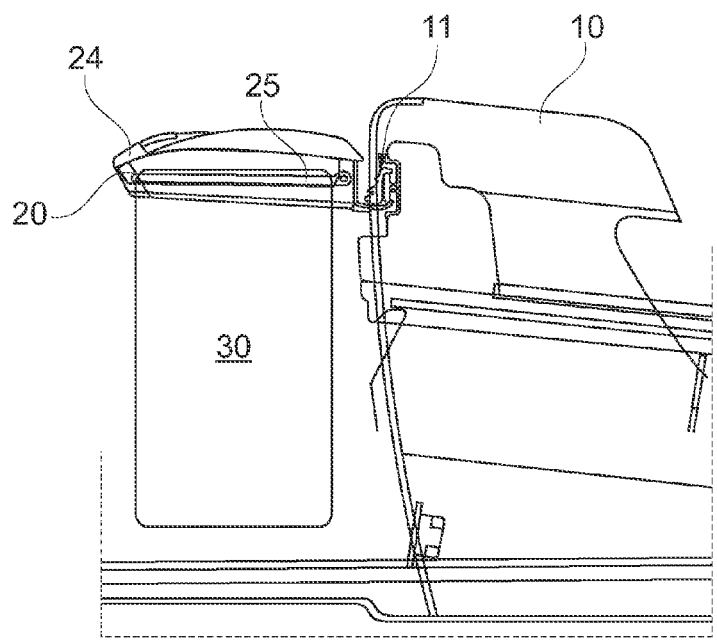

Mounted on the frame 20 is a cover 24 pivotable to the right as well as a clamping element 25 which is also formed like a frame and pivotable to the right. A bag 30 can be guided with the region of its opening edge through the frame-shaped clamping element 25, wherein the opening edge is placed laterally over the clamping element 25 and is pulled downwards. For this purpose, the cover 24 is open and the clamping element 25 is pivoted to the right (see FIG. 3). Subsequently, the clamping element 25 is pivoted to the left so that it rests on the frame 20 and the bag 30 is clamped between the frame 20 and the clamping element 25 (see FIG. 4).

Figure 5:
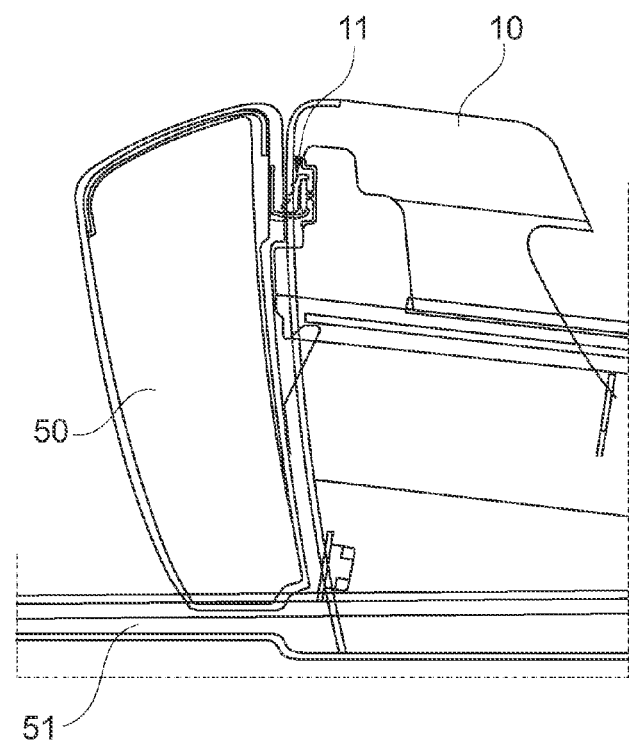
FIG. 5 shows a side view of the center console and a further box.
Figure 6:
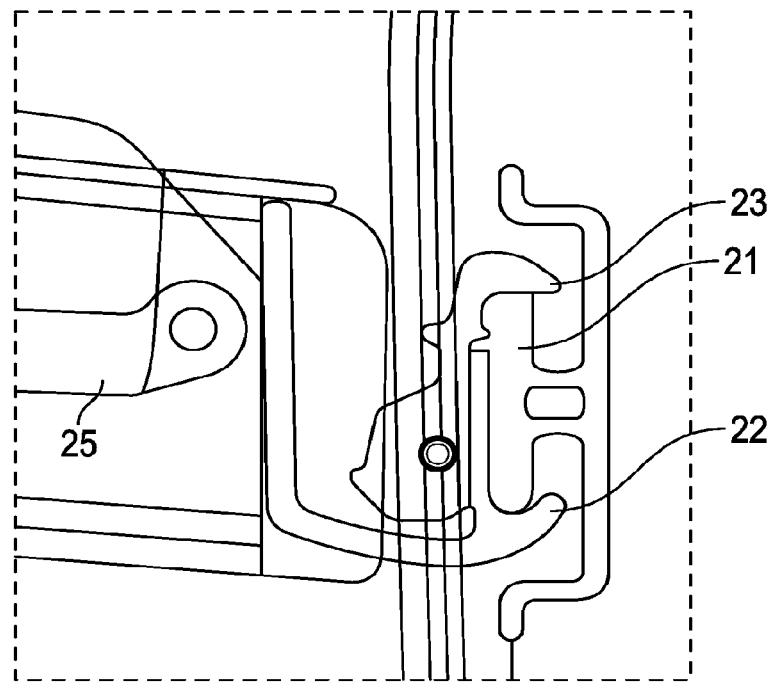
FIG. 6 shows a detail view of the center console of FIG. 2 with the latching connection in a first position.
Figure 7:
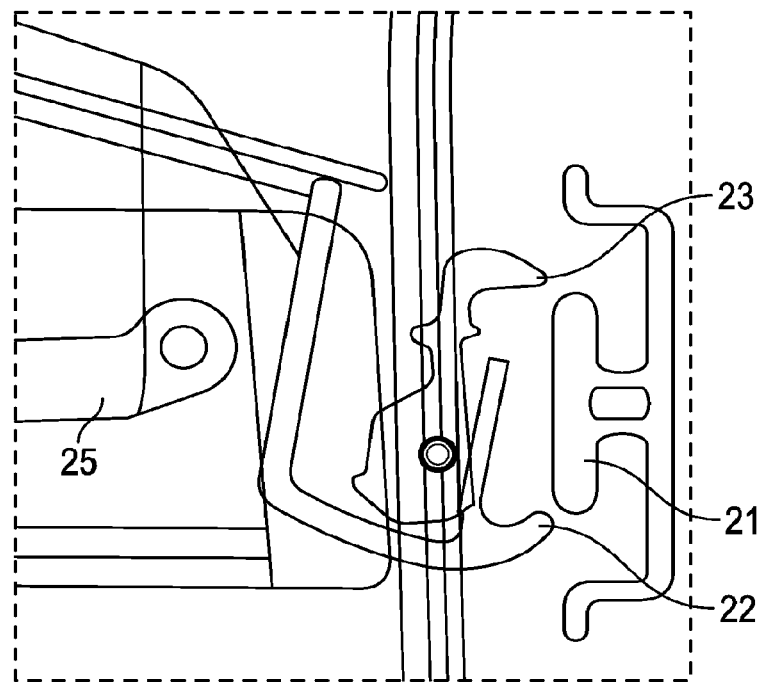
FIG. 7 shows a detail view of the center console of FIG. 2 with the latching connection in a second position.

FIG. 5 shows a box 50 which can be detachably fastened to the center console 10 by means of the latching connection 11. The box 50 extends almost up to a floor 51 so that the box has a very large filling volume. The box 50 can serve, for example, as garbage container. However, it can also be used for storing objects, for example toys for children.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A center console which is provided between a first seat arranged next to a second seat, comprising:
   a front side having a T-shaped hook; and
   a container on the front side that is arranged in detachable manner, the container having a frame with a first claw pivotally attached to the frame and a second claw pivotally attached to the frame, the first claw pivotable relative to the second claw between an open position in which the container is detachable from the center console and a closed position in which the container is fastened to the center console,
   wherein in the closed position the first claw and the second claw encompass the T-shaped hook to fasten the frame of the container to the front side of the center console.

2. The center console according to claim 1, wherein the container is a box.

3. The center console according to claim 1, further comprising a bag, wherein the bag includes at least one carrying handle to couple the bag to a hook formed on a side wall of the container.

4. The center console according to claim 2, wherein the box further comprises a hook on a side wall of the box that receives at least one carrying handle from one bag of a plurality of plastic bags stored on a roll contained within the box.

5. The center console according to claim 1, wherein a bag is couplable to the frame.

6. The center console according to claim 5, further comprising a cover and a clamping element on the frame and arranged so as to be pivotable relative to the frame.

7. The center console according to claim 6, wherein the bag is clampable in a region of an opening edge between the frame and the clamping element.

8. The center console according to claim 2, wherein the box extends at least approximately up to a floor.

* * * * *